United States Patent
Kumar et al.

(10) Patent No.: US 10,915,417 B1
(45) Date of Patent: Feb. 9, 2021

(54) AUDIT CORRECTNESS OF ASYNCHRONOUS BATCH TRANSFORMATION SYSTEMS

(71) Applicant: Amazon Technologies, Inc., Seattle, WA (US)

(72) Inventors: Anil Kumar, Seattle, WA (US); Naveen Anand Subramaniam, Seattle, WA (US); Rishabh Animesh, Seattle, WA (US); James Caleb Kirschner, Seattle, WA (US); Paul D. Franklin, Seattle, WA (US); Brian Gouldsberry, Seattle, WA (US); Qingqing Xiao, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 134 days.

(21) Appl. No.: 16/358,273

(22) Filed: Mar. 19, 2019

(51) Int. Cl.
*G06F 11/30* (2006.01)
*G06F 11/10* (2006.01)
*G06F 16/25* (2019.01)
*G06F 9/30* (2018.01)
*G06F 16/17* (2019.01)

(52) U.S. Cl.
CPC ...... *G06F 11/3072* (2013.01); *G06F 9/30029* (2013.01); *G06F 11/1004* (2013.01); *G06F 16/1734* (2019.01); *G06F 16/254* (2019.01)

(58) Field of Classification Search
CPC ............ G06F 11/3072; G06F 11/1004; G06F 2221/2101; G06F 2221/0775; G06F 2221/0782
See application file for complete search history.

(56) References Cited

U.S. PATENT DOCUMENTS

| 7,124,302 | B2 * | 10/2006 | Ginter | G06F 21/10 713/189 |
| 8,291,238 | B2 * | 10/2012 | Ginter | G06F 21/10 713/189 |
| 2020/0192779 | A1 * | 6/2020 | Minja | G06F 11/3034 |

* cited by examiner

*Primary Examiner* — Nadeem Iqbal
(74) *Attorney, Agent, or Firm* — Davis Wright Tremaine LLP

(57) ABSTRACT

First audit information corresponding to a first set of log entries associated with a transformation performed on first data is obtained, where the first audit information includes a first commutative result produced by applying a commutative function to object identifiers associated with the first set of log entries. Second audit information corresponding to a second set of log entries associated with the transformation performed on second data is obtained, with the second data being a different representation of the first data and where the second audit information includes a second commutative result produced by applying the commutative function to object identifiers associated with the second set of log entries. The first commutative result is compared with the second commutative result to validate whether the second data matches the first data. One or more actions are performed depending on whether the second data is the successful transformation of the first data.

20 Claims, 6 Drawing Sheets

AUDIT CORRECTNESS OF ASYNCHRONOUS BATCH TRANSFORMATION SYSTEMS

BACKGROUND

In various contexts, managing the verification and validation of data within various data storage systems is of utmost importance in many computing services. Computing services often utilize networks of distributed data storage systems to store various data objects. These data objects often must be modified to be stored in various data storage systems. For various reasons, some of these data objects are often additionally copied or transferred to an alternative data storage system; this transfer may require a transformation of the data object to a form required by the alternative data storage system. The transformation, transfer, and storage of data in this manner can introduce various corruptions of the data, as the data must undergo various modifications to be stored and transferred in various data storage systems. Auditing such transfers to detect such corruption presents a challenge, especially when large amounts of transforming operations and/or data are involved.

BRIEF DESCRIPTION OF THE DRAWINGS

Various techniques will be described with reference to the drawings, in which.

DETAILED DESCRIPTION

Techniques and systems described below relate to validating data between two sets of log entries using a technique that produces an order independent checksum (also referred to as a fingerprint) for each of the sets of log entries. In one example, a first set of log entries produced by a first service is obtained. In the example, entries of the first set of log entries correspond to operations performed on first data. Next in the example, a first set of operation counts associated with different operation types in the first set of log entries is computed.

Still in the example, first audit information is computed based on the first set of operation counts and a first checksum corresponding to data object identifiers in the first set of log entries. Next in the example, a second set of log entries produced by a second service is obtained. In the example, entries of the second set of log entries likewise correspond to the operations, albeit performed in a different order, on second data. In this example, the second data is a different representation of the first data.

Continuing in the example, a second set of operation counts associated with the different operation types in the second set of log entries is computed. Further in the example, second audit information is computed based on the second set of operation counts and a second checksum corresponding to data object identifiers in the second set of log entries. Next in the example, an audit result is determined by comparing the first audit information with the second audit information. Finally in the example, an indication, based on the audit result, of whether an error has occurred in performance of the operations is transmitted.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Figure 1:
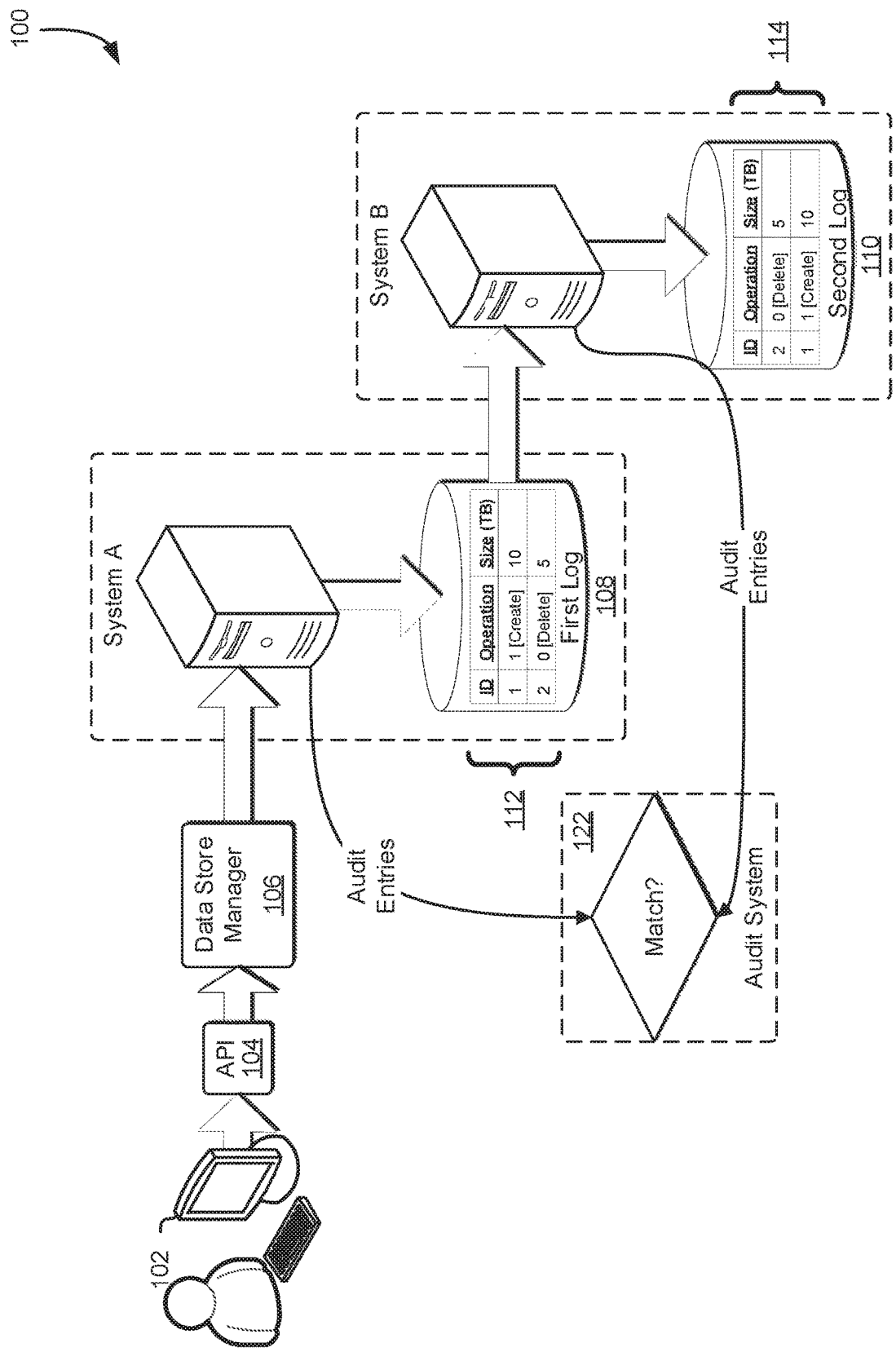
FIG. 1 illustrates an example of a system for auditing transformed data in accordance with an embodiment.

FIG. 1 illustrates an example of a system for auditing transformed data in accordance with an embodiment. Specifically, FIG. 1 depicts an example 100 of an audit system 122 auditing transformed data, whereby a client device 102 submits, to a data store manager 106 via one or more application programming interfaces (APIs), such as API 104, commands to perform operations, which may be mutating operations, on data of a customer of a computing resource service provider. A first data storage system 108 obtains the commands from the data store manager 106 and generates a first log 112 of the operations. A second data storage system 110 further obtains the list of operations from the first log 112 and generates a second log 114 of the operations. Note that, in embodiments, the operations are commutative and therefore the entries in the first log 112 and the second log 114 are not necessarily in the same order, as illustrated in FIG. 1.

In some examples, a computing resource service provider is an entity that provides to its customers one or more computing resource services individually or as a combination of services of a distributed computer system. Examples of types of computing resources provided by the computing resource service providers include Infrastructure-as-a-service (IaaS), platform-as-a-service (PaaS), and/or software-as-a-service (SaaS). The one or more computing resource services of the computing resource service provider may be accessible to users via a network and may include services such as virtual computer system services, block-level data storage services, cryptography services, on-demand data storage services, notification services, authentication services, policy management services, task services and/or other such services. Not all embodiments described include all of the services described, and additional services may be provided in addition to, or as an alternative to, services explicitly described.

Customers of the computing resource service provider may communicate with one or more of the services via an interface, which may be a web services interface or any other type of customer interface. Each service provided by a computing resource service provider may have its own interface, and subsets of the services may have corresponding individual interfaces in addition to, or as an alternative to, a common interface. A customer may communicate with the computing resource service provider through a network, whereby the network may be a communication network, such as the Internet, an intranet, an internet service provider (ISP) network and/or some other such network as described in the present disclosure.

In an embodiment, the client device 102 is any entity operable to access systems and/or services such as the data store manager 106, first data storage system 108, and second data storage system 110. In some examples, the client device 102 is a device operated by a customer of a computing resource service provider that hosts one or more of the systems depicted in FIG. 1. The customer may be an individual, group of individuals, business entity or other organization that has a business relationship with the computing resource service provider of the various systems and/or services. In the present disclosure, it is contemplated that use of the term "client" can include a computing device (also referred to as a "client device") used to perform operations under the control of or on behalf of the client (e.g., to access a service and/or system). Examples of such a computing device include one or more instances of a physical computing instance (e.g., a physical server computer, a mobile communication device, a laptop computer, a tablet computer, a personal computer, a mainframe, etc.) or one or more instances of a virtual computing instance, such as a client-accessible virtual machine hosted on one or more computer servers, or other computing system capable of communicating with a service and/or system. In some examples, a "service" refers to an executing computer application that provides functionality to another computer application.

The client device 102 may communicate to the various systems and/or services through one or more communication networks, such as the Internet. Further, the various communications to/from the client device 102 may be orchestrated by a browser or other application executing on the client device 102. In an embodiment, the client device 102 communicates to the data store manager 106 through the one or more APIs 104. In some examples, the API 104 may be a set of subroutine definitions, communication protocols, and/or software tools that provide a method of communication to/from the client device 102 and the data store manager 106.

The data store manager 106 may be a collection of computing resources, physical and/or virtual, configured to operate, store, and/or access data. The data store manager 106 may manage data objects on data stores, which may be hosted by one or more physical computing instances, such as a physical computing server, or one or more virtual computing instances, such as a virtual machine; these computing instances can also be a part of a larger network of computing instances. The data store manager 106 may also manage various repositories for data objects, such as database records, flat files, and other data objects. Examples of data stores include file systems, relational databases, non-relational databases, object-oriented databases, comma delimited files, and other files. Additionally, the data store manager 106 may allow data to be provided in responses to requests for the data and may operate using computing resources (e.g., databases) that enable the data store manager 106 to locate and retrieve data quickly. In an embodiment, the data store manager 106 operates and manages data stored on the first data storage system 108 and second data storage system 110.

The first data storage system 108 may be configured to operate, store, and/or access data. For example, the first data storage system 108 may be an on-demand data storage service. In some examples, an on-demand data storage service is a collection of computing resources configured to synchronously process requests to store and/or access data. An on-demand data storage service may allow data to be provided in responses to requests for the data and may operate using computing resources (e.g., databases) that enable the on-demand data storage service to locate and retrieve data quickly. For example, the on-demand data storage service may maintain stored data in a manner such that, when a request for a data object is retrieved, the data object can be provided (or streaming of the data object can be initiated) in a response to the request. As noted, data stored in an on-demand data storage service may be organized into data objects. The data objects may have arbitrary sizes except, perhaps, for certain constraints on size.

Thus, the first data storage system 108 may store numerous data objects of varying sizes. The first data storage system 108 may additionally operate as a key value store that associates data objects with identifiers of the data objects that may be used to retrieve or perform other operations in connection with the data objects stored by the first data storage system. The first data storage system 108 may store data objects on one or more physical computing instances, such as a physical computing server, or one or more virtual computing instances, such as a virtual machine; these computing instances can also be a part of a larger network of computing instances. Note that, in the present disclosure, the first data storage system 108 may alternatively be referred to as "system A." In an embodiment, the first data storage system 108 comprises a first log 112 that comprises a log of the operations performed on a specific set of data.

The first log 112 may be a log of entries that comprise records of performance of the operations, which in some examples may be mutating operations, performed on a specific set of data stored with the first data storage system 108. Note that, in the present disclosure, operations that create, delete, or otherwise alter data may be referred to as "mutating operations." Each log entry of the first log 112 may correspond to an operation (e.g., a mutating operation) performed on a specific set of data within the first data storage system 108. For example, an entry of the first log 112 may comprise fields such as an operation code that denotes the type of operation performed on the data (in the present disclosure, "operation type" or simply "operation" may be used to denote the type of operation indicated/represented by the operation code), an identifier (ID) that may be a value denoting various aspects of the entry, such as a data object ID associated with the operation performed on the data affected by the operation (also referred to in the present disclosure as "operation ID" or "archive ID") and/or variations thereof. Other fields may include a size field (e.g., "operation size"), which may denote the size of the data affected by the operation the entry corresponds to, and/or variations thereof.

The second data storage system 110 may be a collection of computing resources, physical and/or virtual, configured to operate, store, and/or access data. In some examples, the second data storage system 110 is a similar type (e.g., an on-demand data storage system) as the first data storage system 108; however, it is contemplated that the second data storage system may be a different type of storage system from the first data storage system 108 (e.g., an archive data storage system, a block level storage system, etc.). The second data storage system 110 may store data objects on one or more physical computing instances, such as a physical computing server, or one or more virtual computing instances, such as a virtual machine; these computing instances can also be a part of a larger network of computing instances. Note that, in the present disclosure, the second data storage system 110 may be referred to as "system B." In an embodiment, the second data storage system 110 comprises a second log 114 that comprises a log of the operations performed on a specific set of data the second data storage system 110 comprises.

The second log 114 may be a log of entries that comprise records of performance of the operations, which in some examples may be mutating operations, performed on a specific set of data stored within the second data storage system 110. Each log entry of the second log 114 may correspond to an operation performed on a specific set of data within the second data storage system 110. The second log 114 may comprise the same or equivalent fields as the first log 112. For example, an entry of the second log 114 may comprise fields for operation code, data object ID, operation size, and so on. In various embodiments, the specific sets of data stored on the first data storage system 108 and second data storage system 110 may correspond to the same set of data; as a result of various processes, the data may be stored in different representations in the first data storage system 108 and second data storage system 110. For example, the specific set of data on the second data storage system 110 may be a representation of the specific set of data on the first data storage system 108 that has been transferred to the second data storage system 110 through an ETL (extract, transform, and load) procedure. It is contemplated, however, that although the log entries in the second log 114 may correspond to the same or equivalent log entries in the first log 112, the log entries in the second log 114 may be in a different order from the log entries in the first log 112. However, it is also contemplated that the operations performed on the data in the distributed system may be commutative in that the same set of operations performed on data in the system achieve the same result even if performed in different orders.

The audit system 122 may be a collection of computing resources, physical and/or virtual, configured to audit entries, log entries, and/or other data objects. The audit system 122 may audit entries through the usage of one or more applications and/or programs existing on the audit system 122. In some examples, the audit system 122 may be automated such that it may compare and audit various audited log entries, such audit information produced from the first log 112 and the second log 114, at various time intervals and/or according to some other auditing schedule (e.g., after a certain number of operations are performed). Additionally, in various embodiments, it is contemplated that the audit system 122 may utilize various operations to produce audit information from a set of log entries and/or other data objects.

In some examples, the first data storage system 108 and second data storage system 110 may analyze a set of entries of the first log 112 and a corresponding set of entries of the second log 114 respectively, and generate representations (e.g., checksums or other "fingerprints" of the data) of each of the sets of entries, which may be referred to in the present disclosure as "audit information." This audit information of the first log 112 and second log 114 may be compared with each other by the audit system 122 in order to determine whether data has been lost or corrupted between performance of the operations by the first data storage system 108 and the second data storage system 110.

As noted, the first data storage system 108 and second data storage system 110 may audit the log entries by applying various transformations to aspects of the log entries to produce audit information that can be compared to validate the log entries. For example, the first log 112 may comprise entries comprising fields corresponding to data object ID, operation code, and data size. The data object ID may refer to an identifier specific to the particular log entry.

In embodiments, the data object ID correspond to a data object that may have one or more operations performed to it. Thus, the data object ID may appear in multiple records in the first log 112. The operation code may refer to the type of operation performed (e.g., create, delete, insert, etc.) on the data, and the data size may refer to the size/amount of the data affected by the operation. In some embodiments, each entry of the first log 112 has a distinct combination of data object ID and operation code from other entries of the first log 112. Likewise, in some embodiments, each entry of the second log 114 has a distinct combination of data object ID and operation code from other entries of the second log 114. In various embodiments, each entry of the second log 114 corresponds to an entry in the first log 112, albeit not necessarily in the same order within the log.

In some embodiments, the data object ID may be transformed by a rotation—such as a bitwise rotation—of the data object ID. For example, the data object ID of a particular entry in the first log may be first transformed according to a rotate right bitwise operation. It is contemplated, however, that other bitwise operations may be used additionally or alternatively, such as rotate left, shift left, shift right, and so on. Furthermore, the bitwise operations may be applied multiple times and/or in combination with other bitwise operations. It is further contemplated that, for various embodiments, the bitwise operations may be repeated a number of times equal to the value of an operation code associated with the particular record. The data object ID rotation(s) may be performed for each entry of the set of entries of the first log 112.

In embodiments, the transformed ID may then be utilized in an "exclusive or" (XOR) operation with the transformed IDs of the other entries of the first log 112. In an embodiment, an XOR operation refers to a bitwise logical operation that outputs a true value only when the inputs (e.g., operands) differ. For example, a 11010 XOR 10110 may produce a result of 01100. In various embodiments, XOR is commutative, such that the same result is produced regardless of the order of the operands. For example, where A is a first data object ID, B is a second data object ID, and C is a third data object ID, A XOR B XOR C=B XOR C XOR A=C XOR B XOR A, and so on.

In various embodiments, the inputs can be logical values, such as true or false, binary values, such as 0 or 1, and so on. For example, inputs to an XOR operation may be a 1, representing true, and a 0, representing false; the output of the XOR operation would be a 1, representing true. In an alternative example, both inputs to an XOR operation may be 0, representing false; the output of the XOR operation would be a 0, representing false, as the inputs do not differ. In various embodiments, other various commutative operations may be utilized in place of the XOR operation. In an embodiment, a commutative operation refers to any operation in which regardless of the permutation and/or order of the operands and/or inputs, the same result will be calculated.

The first data storage system 108 may then determine the result of the XOR and/or other commutative operation, with a count of the number of operations in the set of entries of the first log 112, and a summation of the size fields of the set of entries of the first log 112 to comprise the first audit information. In various examples, a similar or same process for the auditing of the first log 112 may be applied to the auditing of the second log 114 by the second data storage system 110 to determine a second audit information. Further information regarding the generation of the audit entries can be found in the description of FIG. 4.

In an embodiment, a first audit information is derived from the first log 112, and a second audit information is derived from the second log 114. The audit system 122 may compare the first audit information with the second audit information to determine if the first audit information matches the second audit information. In various embodiments, if the first audit information matches the second audit information, it indicates that the various operations performed by the first data storage system 108 and the second data storage system 110 as indicated by the first log 112 and second log 114 are a match, and that the specific set of data stored on the first data storage system 108 likewise corresponds to and/or matches the specific set of data stored on the second data storage system 110.

In some embodiments, a match between two values denotes that the values are identical. Note though that, in various embodiments, a match does not necessarily require equality. For example, two values may match if they are not equal but mathematically equivalent. As another example, two values may match if they correspond to a common object (e.g., value) or are in some predetermined way complementary and/or they satisfy one or more matching criteria. Generally, any way of determining whether there is a match may be used. In some examples, the operations indicated by the first log 112 may be performed in a different order and/or permutation, such as the operations indicated by the second log 114; in various examples, operations may be commutative, in that regardless of order and/or permutation, sets of operations are a match as long as they comprise the same operations.

In various embodiments, if the first audit information does not match the second audit information, it may indicate that the operations indicated by the first log 112 are not a match to the operations indicated by the second log 114 and/or that the specific set of data stored on the first data storage system 108 corresponds to different data from the data that the specific set of data stored on the second data storage system 110 corresponds to. In an embodiment, if the first audit information does not match the second audit information, the audit system 122 may perform an action, such as sending a notification to the client device 102 or to some other entity of the computing resource service provider that manages the first data storage system 108 and/or second data storage system that the audit indicates a data validation error. In some embodiments, the audit system 122 may, by sending the notification or by another signal, cause a set of recovery operations to be performed by the first data storage system 108 and/or the second data storage system 110 and/or some other system of the provider to attempt to restore data that the audit indicates may have been corrupted. Such recovery operations may include a rollback of the affected data to a previous state and/or re-application of the operations corresponding to the sets of entries in the first log 112 and the second log 114 on the restored data. In some embodiments, the mismatch of the audit information may trigger a performance of a process to determine the cause of the error, such as triggering various diagnostic operations to be performed on one or more of the computing devices involved in performing the operations and/or storing the data corresponding to the set of entries in the first log 112 and the second log 114.

Figure 2:
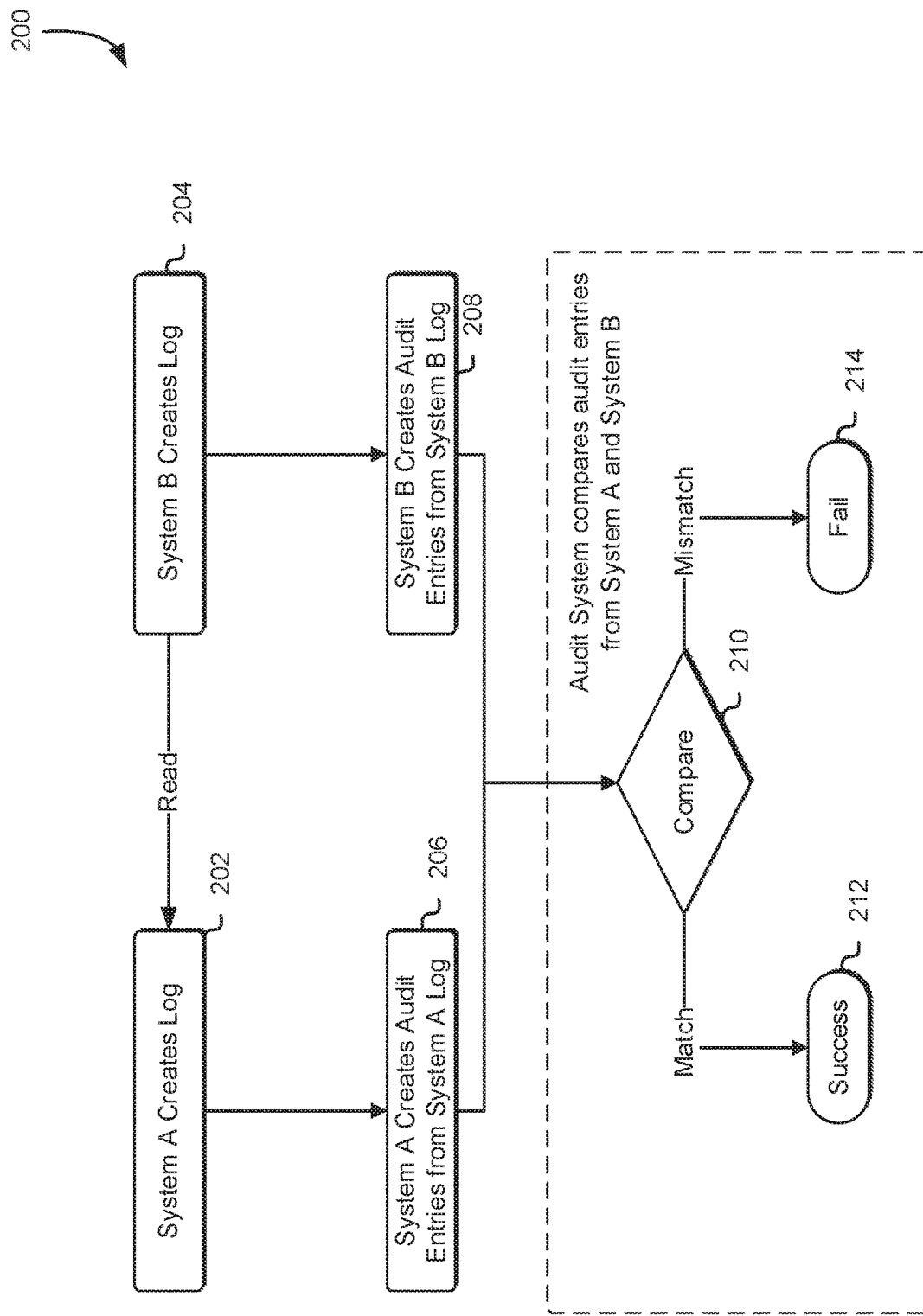
FIG. 2 is a flowchart that illustrates an example of generating and comparing audit entries in accordance with an embodiment.

FIG. 2 is a flowchart illustrating an example of a process 200 for generating and comparing audit entries in accordance with various embodiments. Some or all of the process 200 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

Figure 6:
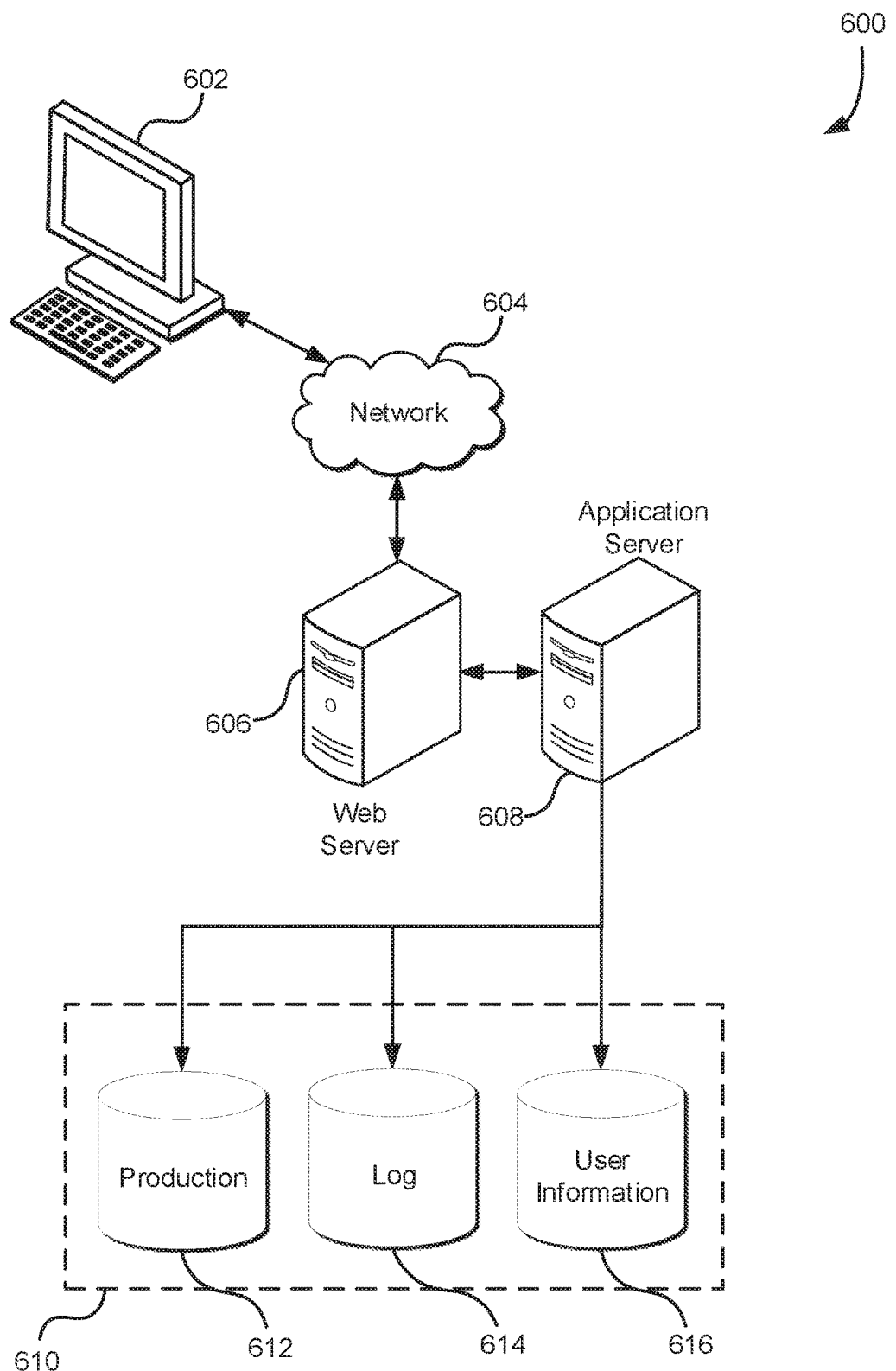
FIG. 6 illustrates a system in which various embodiments can be implemented.

For example, some or all of process 200 may be performed by any suitable system, such as a server in a data center, by various components of the system 600 described in conjunction with FIG. 6, such as the web server 606 or the application server 608, by multiple computing devices in a distributed system of a computing resource service provider, by any electronic client device such as the electronic client device 602, or a system such as the audit system 122 described in connection with FIG. 1.

In an embodiment, the process 200 includes a system A that creates 202 a log of operations performed to a first set of data. The system A may be a system like the system A 108 described in connection with FIG. 1. In various embodiments, the system A may be a collection of computing resources, physical and/or virtual, configured to operate, store, and/or access data. The system A can store data objects on one or more physical computing instances, such as a physical computing server, or one or more virtual computing instances, such as a virtual machine; these computing instances can also be a part of a larger network of computing instances. In an embodiment, the system A creates 202 a log corresponding to operations performed on a specific set of data stored with the system A.

Likewise, the process 200 includes a system B that creates 204 a second log of operations performed to a second set of data. The second set of data may be the same data as in the first set of data, but in a different format. Likewise, the second log of operations may include the same operations as in the first log of operations, but may be in a different order from the first log of operations. The system B may be a system like the system B 110 described in connection with FIG. 1. In various embodiments, the system B may be a collection of computing resources, physical and/or virtual, configured to operate, store, and/or access data. The system B can store data objects on one or more physical computing instances, such as a physical computing server, or one or more virtual computing instances, such as a virtual machine; these computing instances can also be a part of a larger network of computing instances. The system B may submit a read command to the system A to receive a transfer of data. In various embodiments, the transfer of data may involve performance of the ETL (extract, transform, and load) procedure. In an embodiment, the ETL procedure comprises three basic operations: extracting, which comprises exporting data from a source; transforming, which comprises transforming the data into a different form required by the destination; and loading, which comprises importing the transformed data into the destination. In an embodiment, the system B 204 comprises a log corresponding to operations performed on a specific set of data the system B 204 comprises; the specific set of data may be the data transferred from the system A utilizing the ETL procedure.

The system performing the process 200 may further include the system A that creates 206 audit entries from the system A log. In various embodiments, the system A log may comprise log entries having various fields such as data object ID, operation code, and data size. The data object ID may refer to an identifier denoting various aspects of the entry, such as an identifier of the data affected by the operation and/or variations thereof, the operation may refer to the operation performed (e.g., create, delete) on the data, and the size may refer to the size of the data affected by the operation.

To create the audit entries, the system A may rotate the data object ID of a log entry via a bitwise rotation based on the operation performed; the operation performed may be modified by the operation field of the same log entry. For example, the operation field may have a binary value of "01" (e.g., corresponding to a create operation), and consequently the data object ID may be rotated one bit to the left (although other rotation schemes may be utilized). On the other hand, if the operation field has a binary value of "00" (e.g., corresponding to a delete operation), the data object ID may be rotated zero bits to the left (i.e., not rotated, thereby keeping the original data object ID). As still another example, if the operation field has a binary value of "10" (e.g., corresponding to a third type of operation), the data object ID may be rotated two bits to the left, and so on. It is further contemplated that the operation field may not strictly correspond to a number of rotations; for example, "00," rather than meaning not to rotate may indicate to apply a bitwise NOT (also referred to as complement) to the data object ID; in such a case, for example, a data object ID of 01101010 would be transformed to 10010101. It is contemplated that various different operations may be associated with the operation codes. In this manner, the type of operation performed becomes part of the checksum of the particular record without having to track the operation type separately. Note that the operation codes in these examples are for illustrative purposes only, and the actual value of the codes and the type of operations to which they correspond may vary from implementation to implementation. Note that these data object ID rotation(s) may be performed for each log entry of the system A log.

The rotated data object IDs of the system A log may be utilized in an XOR operation or other commutative operations. The system A may then utilize the result of the XOR operation and/or commutative operation with a count of the number of operations in the log entries and a summation of the sizes of each entry to determine the audit entries. In various embodiments, the system A may conduct separate counts for each operation type; e.g., in an example, counting 10,418 create operations and 5,024 delete operations. In various examples, a similar or same process for the create 206 audit entries from system A log may be applied by the system B to create 208 audit entries from system B log to determine. Further information regarding the generation of the audit entries can be found in the description of FIG. 4.

The dashed box in FIG. 2 represents operations that are performed by the audit system. The audit system may compare 210 the audit entries from system A and system B created in 206-08. In some examples, the audit system may be a system like the audit system 122 described in connection with FIG. 2. For example, the audit system may be a collection of computing resources, physical and/or virtual, configured to audit entries, log entries, and/or other data objects. The audit system may audit log entries and/or other data objects through the usage of one or more applications and/or programs existing on the audit system. In some examples, the audit system may be automated in that it may audit various objects at various time intervals.

The audit entries from system A and system B may be compared 210 by the audit system to determine if the audit entries match. For example, the audit system may compare 210 whether the counts of operations of system A match the counts of operations of system B. In some embodiments, the counts are a total of all operations. In other embodiments, the counts are separate for each operation type; in this manner, in the event that the total number of operations is the same but certain operations are transposed (e.g., system A records 10 create operations and 5 delete operations, whereas system B records 10 delete operations and 5 create operations), the audit system can detect such transposition using the separate counts (e.g., counts of the same operation types between system A and system B do not match).

The audit system may further compare 210 if the size of data affected by the operations of system A matches the size of data affected by the operations of system B. In a similar manner, the audit system may compare the sizes separately for each operation type; in this manner, in the event that the total size of data is the same but data and/or operations are transposed (e.g., system A records 10 terabytes of create operations and 5 terabytes of delete operations, whereas system B records 10 terabytes of delete operations and 5 terabytes of create operations), the audit system can detect such transposition using the separate sizes (e.g., sizes of data affected by the same operation type between system A and system B do not match).

The audit system may further compare whether the transformed (e.g., rotated and/or XORed data object IDs) information from each of system A and system B match. In various embodiments, if audit entries match, the audit system may determine that the specific sets of data stored on the system A and system B match with each other and/or comprise the same data, and consequently the audit system determines that the audit of the operations performed on the specific sets of data stored on the system A and system B is a success 212. In various embodiments, if any of the above-described audit entries (e.g., counts, sizes, transformed data object IDs, etc.) do not match, it may be that the specific sets of data stored on system A and system B likewise do not match and/or comprise different data. Consequently, the audit system determines that the audit reveals a failure 214 of the operations performed on the specific sets of data stored on system A and system B. The audit system may submit the results (e.g., success or failure) of the audit to one or more entities, such as a customer of a computing resource service provider whose data is being audited, an administrator of the computing resource service provider, or to a database record.

Note that in various embodiments, the audit system performs the compare 210 on multiple dimensions of data; such as the three dimensions including operation counts, sizes of data, and transformed data object IDs. However, it is contemplated that techniques of the present disclosure may be applied to more than three dimensions of data. Furthermore, it is contemplated that the techniques of the present disclosure may be applied to dimensions other than the operation counts, sizes of data, and transformed data objects described herein.

Note that although the process 200 depicts the operations of 206 and 208 as being performed by the system A and system B respectively, it is contemplated that, in some implementations, the audit system may perform these operations. The process 200 may be performed to a set of logs according to a time interval (e.g., every 6 hours), whenever a set of logs accumulates a certain number of records, or according to some other schedule. The process may repeat each time a new set of logs reaches the time interval, accumulates a certain number of records, or meets some other schedule. It should be noted that in various embodiments, one or more of the operations performed in 202-14 might be performed in various orders and combinations, including in parallel.

Figure 3:
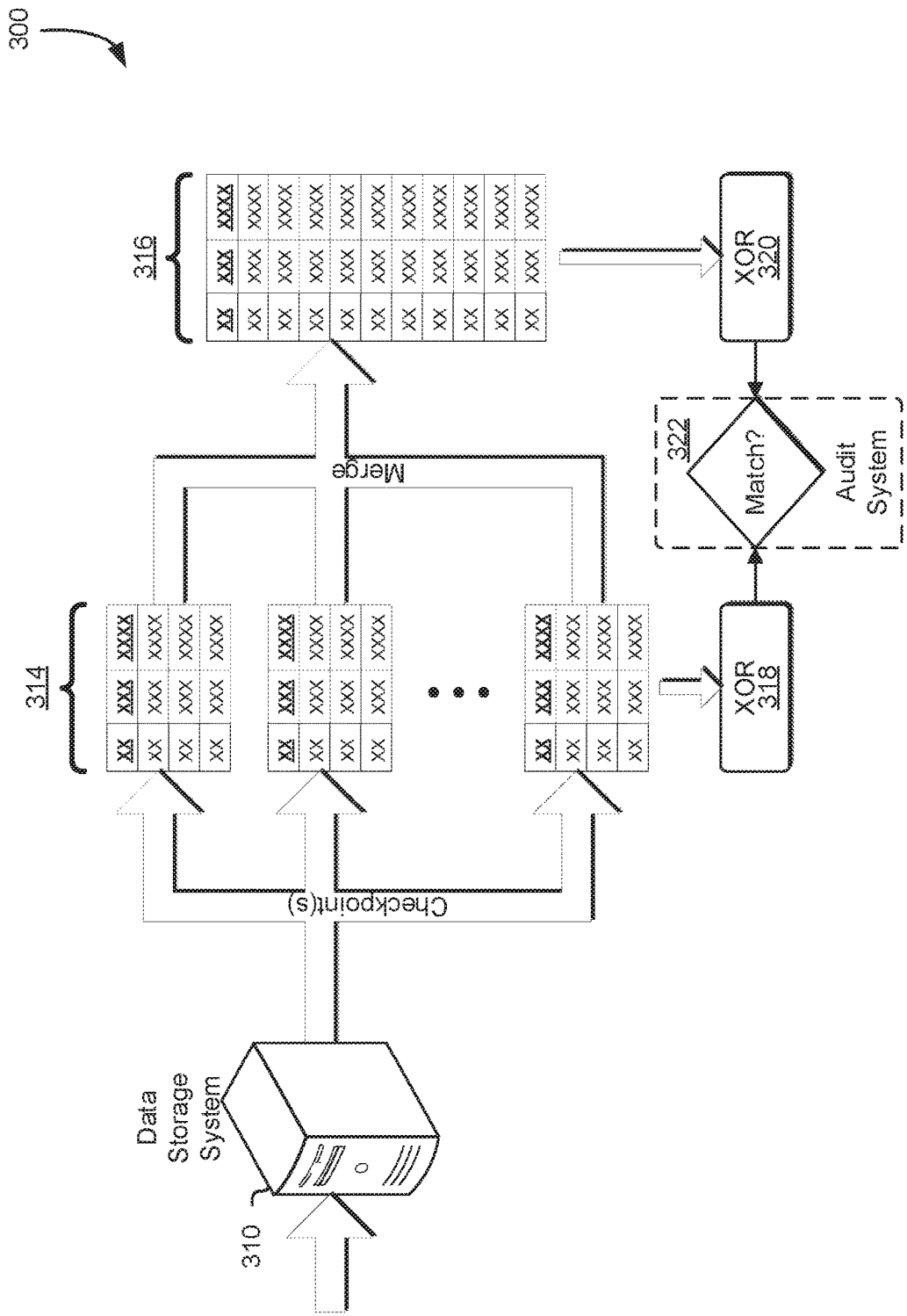
FIG. 3 illustrates an example of auditing transformed data in accordance with an embodiment.

FIG. 3 illustrates an example of a checkpointing in accordance with an embodiment. Specifically, FIG. 3 depicts an example 300 of the merging of various intervals of log entries through a process, which may be denoted as a checkpoint process, within the data storage system 310. In some examples, the data storage system 310 may be a data storage system like the second data storage system 110 described in connection with FIG. 1. The data storage system 310 may produce sets of logs 314 similar to the second log 114 of FIG. 1. As can be seen in FIG. 3, at a checkpoint the sets of logs 314 may, for various reasons, be merged into a merged log 316 that contains all of the distinct entries in the set of logs 314. A similar process as the process described in FIGS. 1-2 may be used to for verifying the merged logs 316 with the set of logs 314 as described below.

The data storage system 310 may be a collection of computing resources, physical and/or virtual, configured to operate, store, and/or access data. The data storage system 310 may store data objects on one or more physical computing instances, such as a physical computing server, or one or more virtual computing instances, such as a virtual machine; these computing instances can also be a part of a larger network of computing instances. As noted above, the data storage system 310 may be similar to the second data storage system 110 of FIG. 1, and as such may have performed the operations recorded in the set of logs 314 to ETL data. In an embodiment, the data storage system 310 comprises log entries that comprise logs of the operations performed on a specific set of data the data storage system 310 comprises.

The sets of logs 314 may be information comprising various details regarding intervals of the log entries the data storage system 310 comprises. That is, each of the set of logs 314 may comprise one or more logs such as the second log 114 of FIG. 1 collected since the previous audit. In various embodiments, the log entries of the data storage system 310 may be processed and/or audited in specific intervals. These intervals may relate to intervals of time (e.g., 6 hours), number of entries (e.g., 10,000 records), and/or variations thereof. Additionally, the intervals may be determined and managed by an audit system, such as the audit system 322. The intervals of log entries may be utilized in an XOR operation and/or other commutative operations to determine a first set of audit entries 318. In some examples, the individual log entries of the intervals of log entries may be transformed, and then utilized in an XOR operation with the other log entries, which may be transformed as well, such that the intervals of log entries may comprise a first set of audit entries 318.

The merged log 316 may be a summation of the intervals comprising sets of log entries. For example, as a result of the data storage system 310 accumulating a certain threshold number (e.g., 10, 50, 100, etc.) of sets of logs, these sets of logs may be combined to form the merged log 316. In various embodiments, the merged log 316 may comprise information relating to the checkpoint process; the information may be utilized to merge the intervals of sets of log entries. Similar to as described about FIGS. 1 and 2, the merged log 316 may comprise data object IDs, operation codes, and data sizes, and the data object IDs may undergo a similar transformation to generate a checksum for the respective record entry. For example, the data storage system 310 may rotate the data object IDs (e.g., left, right, etc.) a number of times corresponding to the operation code for the record (as described above) to form a transformed ID. The data storage system 310 may utilize an XOR operation and/or other commutative operation to each of the transformed IDs to produce a checksum/fingerprint for the merge log 316, which, along with counts of operations (or counts of operations of different types, depending on the embodiment) and data sizes as described for FIGS. 1 and 2, comprise a second set of audit entries 320. In some examples, the individual log entries of the merged intervals may be transformed, and then utilized in an XOR operation with the other log entries, which may be transformed as well, such that the merged intervals may comprise the second set of audit entries 320.

The audit system 322 may be a collection of computing resources, physical and/or virtual, configured to audit entries, log entries, and/or other data objects. The audit system 322 may audit entries through the usage of one or more applications and/or programs. Additionally, the audit system 322 may utilize various operations to compare audit information from sets of log entries and/or other data objects. In some examples, the audit system 322 may be automated in that it may compare the audited log entries of the data storage system 310 at various time intervals.

In various embodiments, each of the sets of logs 314 has been previously audited according to the operations of 208 in FIG. 2. As a result, the data storage system 310 may generate the first set of audit entries 318 based on the audit entries produced in the operations of 208 rather than having to repeat the operations of 208 for each of the sets of logs 314. For example, the data storage system 310 may sum the operation counts in the audit entries of each of the sets of logs 314 to obtain total operation counts for the first set of audit entries. Likewise, the data storage system 310 may sum the data sizes in the audit entries of each of the sets of logs 314 to produce total data sizes for the first set of audit entries 318. Similarly, the data storage system 310 may perform a commutative transformation on the checksums/fingerprints of the sets of logs 314 to produce a checksum/fingerprint for the first set of audit entries 318.

Then, the audit system 322 may compare the first set of audit entries 318 with the second set of audit entries 320. In some examples, the first set of audit entries 318 results from an auditing of the intervals of log entries; these individual intervals of log entries may be summed utilizing a checkpoint process and audited by the data storage system 310 to result in the second set of audit entries 320. In an embodiment, the merged log 316 is successfully validated in the event that the first set of audit entries 318 matches the second set of audit entries 320. For example, because XOR is a commutative operation, on a successful validation XORing the XORed fingerprints of the sets of logs 314 should match with the result of XORing the transformed IDs of the merged log 316. Likewise, on a successful validation, the total operation counts of the sets of logs 314 should match the operation counts of the merged log 316. Similarly, on a successful validation, the total data sizes of the sets of logs 304 should match with the data sizes of the merged log 316.

Figure 4:
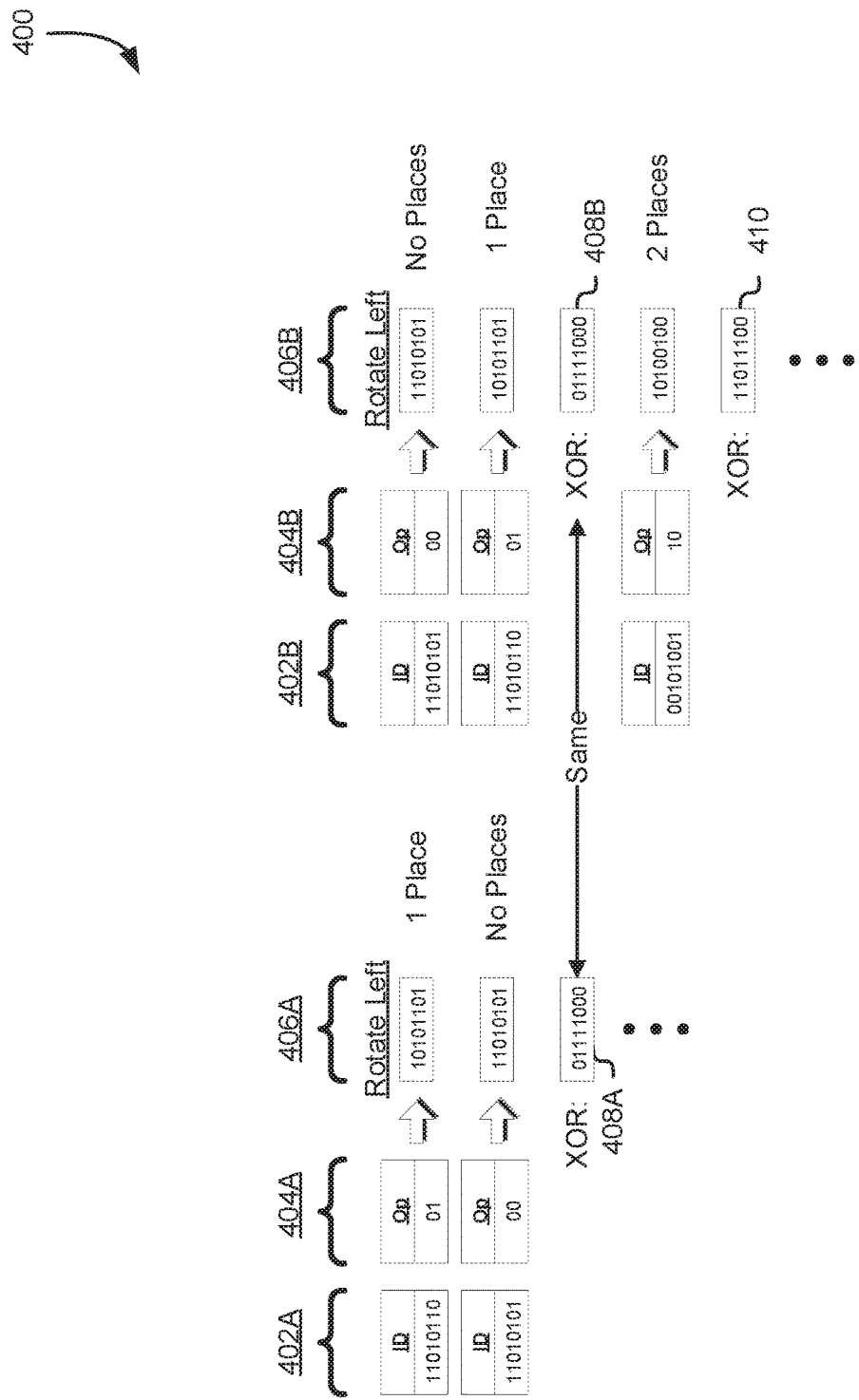
FIG. 4 illustrates an example of generating and comparing audit entries in accordance with an embodiment.

FIG. 4 illustrates an example of generating and comparing audit entries in accordance with an embodiment. Specifically, FIG. 4 depicts an example 400 of transforming data object IDs and performing a commutative operation (e.g., XOR) on the resulting transformed ID for each of a separate set of records and illustrating that the results should be the same for successful validation. In various examples, the generation and comparison of audit entries can be performed by any suitable system, such as the system described in connection with FIG. 2. In an embodiment, the components 402A-04A originate from a system, such as system A 108 described in connection with FIG. 1, and the components 402B-04B originate from a different system, such as system B 110 described in connection with FIG. 1.

The first set of data object IDs 402A may be identifiers of a group of log entries maintained by a system, such as system A 108 of FIG. 1; in various embodiments, the first set of data object IDs 402A may alternatively be referred to as operation IDs, archive IDs, and/or variations thereof. In various examples, a system may store a group of log entries corresponding to various operations, which in some examples may be operations (e.g., create, delete, etc.), performed on a specific set of data. In some implementations, the operations are performed by the systems of a computing resource service provider on customer data at the request of the customer owner of the data. The first set of data object IDs 402A may be particular entries, such as identifiers corresponding to a specific operation performed on specific data of system B.

The second set of data object IDs 402B may be identifiers of another group of log entries maintained by a different system from the system that maintains the group of log entries associated with the first set of data object IDs 402A, such as the system B 110 of FIG. 1; in various embodiments, the second set of data object IDs 402B likewise may be referred to as operation ID, archive ID, and/or variations thereof. The second set of data object IDs 402B may be particular entries, such as identifiers corresponding to the specific operation performed on the specific data of system B, which, in the event no errors occurred, should be the same data as the specific data of system A, but in a different format. In an embodiment, the second set of data object IDs 402B originates from a different system than the first set of data object IDs 402A. Note that each of the second set of data object IDs 402B should have a corresponding data object ID in the first set of data object IDs 402A for validation to be successful. For example, FIG. 4 illustrates a data object ID of 11010110 in the data object IDs 402A, and a data object ID of 11010110 also exists in the data object IDs 402B (albeit in a different order). A data object ID in the second set of data object IDs 402B that does not have a matching data object ID in the first set of data object IDs 402A is an indication that an error has occurred in either performing the operations or in logging between system A and system B.

The first set of operation codes 404A may be values that identify the type of operations (e.g., create, delete, insert) that were performed to data maintained by system A; in the present disclosure, operation codes may be alternatively referred to as "operations." In various examples, a system may comprise a group of log entries corresponding to various operations, which in some examples may be mutating operations, performed on a specific set of data. For example, an operation code of 00 may correspond to a delete operation (e.g., delete specified data stored with the system), an operation code of 01 may correspond to a create operation (e.g., store/upload data to the system), an operation code of 10 may correspond to an insert operation, and so on. In an embodiment, the first set of operation codes 404A originates from the same system the first set of data object IDs 402A originates from. Note that it is further contemplated that there may be any number of different operation codes, depending on implementation.

The second set of operation codes 404B likewise may be values that identify the type of operations that were performed to the data maintained by system B. The second set of operation codes 404B may be identifiers denoting various aspects of the operations performed (e.g., create, delete, insert) to which the group of log entries correspond. As with the data object IDs 402A-02B, corresponding records should have matching operation codes 404A-04B for validation to be successful.

The first set of rotation results 406A may be results of a rotation scheme utilized as part of the auditing process of a first group of log entries. Examples of rotation schemes and other operations have been described above. For example, the first set of data object IDs 402A may be rotated via a bitwise rotation based on the operation performed as indicated by the first set of operation codes 404A; for example, if the operation code of the first set of operation codes 404A is "01," the corresponding first data object ID of the first data object IDs 402A may be rotated one bit to the left (although other rotation schemes may be utilized), whereas if the operation code is "00," the corresponding first data object ID of the first data object IDs may remain un-rotated. The rotation scheme may be performed on each first data object ID of the first set of data object IDs 402A. As illustrated in the example 400, the first data object ID of the first data object IDs 302A is "11010110" with an operation code of "01," which causes the rotation scheme to rotate the bits of the first data object ID one place to the left, resulting in "10101101." The second data object ID of the first set of data object IDs 402A is seen to be "11010101" with an operation code of "00," which in this example indicates to not perform a rotation (i.e., rotate zero bits), resulting in the "11010101." In this manner, the rotation scheme may be performed on each of the first set of data object IDs 402A.

The second set of rotation results 406B may be results of the same rotation scheme (as utilized to produce the first rotation results) utilized as part of the auditing process of a second group of log entries. For example, the second set of data object IDs 402B may be rotated via a bitwise rotation based on the operation performed as indicated by the second set of operation codes 404B in a similar manner as described above. As illustrated in the example 400, the first data object ID of the second set of data object IDs 402B is "11010101" with an operation code of "00," and which causes the rotation scheme to leave the bits of the first data object ID unrotated, resulting in "11010101." The second data object ID of the second set of data object IDs 402B is seen to be "11010110" with an operation code of "01," which in this example indicates to rotate the data object ID one bit to the left, resulting in "10101101." In this manner, the rotation scheme may be performed on each of the second set of data object IDs 402B.

The first audit entry 408A may be the result of transformation (in this example, an XOR operation) of the first set of rotation results 406A. Likewise, the second audit entry 408B may be the result of an XOR operation on the second set of rotation results 406B. In an embodiment, the first audit entry 408A is compared with the second audit entry 408B. As can be seen in the example 400, the transformation, XOR, is commutative such that even though the entries are in different orders between system A and system B, the first audit entry 408A of "0111100" is a match to the second audit entry 408B of "01111000."

In some examples, a successful audit denotes that the first audit entry 408A matches the second audit entry 408B, which indicates that first audit entry 408A and second audit entry 408B correspond to the same set of operations (which may be performed in any order, performed on the same specific set of data, which may be in different representation). In various embodiments, the XOR operation may be replaced with other various commutative operations. In various embodiments, groups of log entries from a system may be audited and compared with other groups of audited log entries from other systems.

In some examples, while the example 400 depicts groups of two log entries utilized in the XOR operations, the scheme described above can be applied to any number of log entries. For example, for further illustration a third data object ID of the second set of data object IDs 402B is shown in the example 400 to be "00101001," and the binary value of its corresponding operation code of the second operation codes is two, indicating that the third data object ID should be rotated bitwise two places to the left to yield "10100100." As can be seen, XORing this result with the previous result yields a third audit entry 410 of "1101100." For a successful validation of the first group of records with the second group of records, the final XORed value of each group should match.

If the final XORed values of each group do not match, it may indicate that an error occurred at or between one of the systems A or B. For example, a possible error may be that operation codes of entries in the group are swapped. To illustrate how such an error would affect the transformation operations, assume, for example, that the first and second operation codes of the second set of operation codes 404B are swapped such that the data object ID "11010101" has the operation code of "01," causing the audit system to rotate the data object ID one bit left to produce "10101011," and the data object ID "11010110" has the operation code of "00" which causes it not to be rotated, yielding "11010110." When these two values are XORed, the result will be "01111101," which can be seen is not a match to the first audit entry 408A of "01111000." In a similar manner, if the log entries of system B are missing an entry or have an extra entry, or if one or more of the data object IDs has a flipped bit, the audit result of system A is likely to be a mismatch to the audit result of system B. In embodiments, the audit system will detect the mismatch and perform an appropriate action, such as notifying a system administrator that an error occurred and/or cause system B to roll back and re-apply the operations of the system A log to system B. Note that the number of log entries in the groups may depend on a fixed constant (e.g., 50,000 entries), a time interval (e.g., 6 hours' worth of accumulated log entries), and/or variations thereof.

Figure 5:
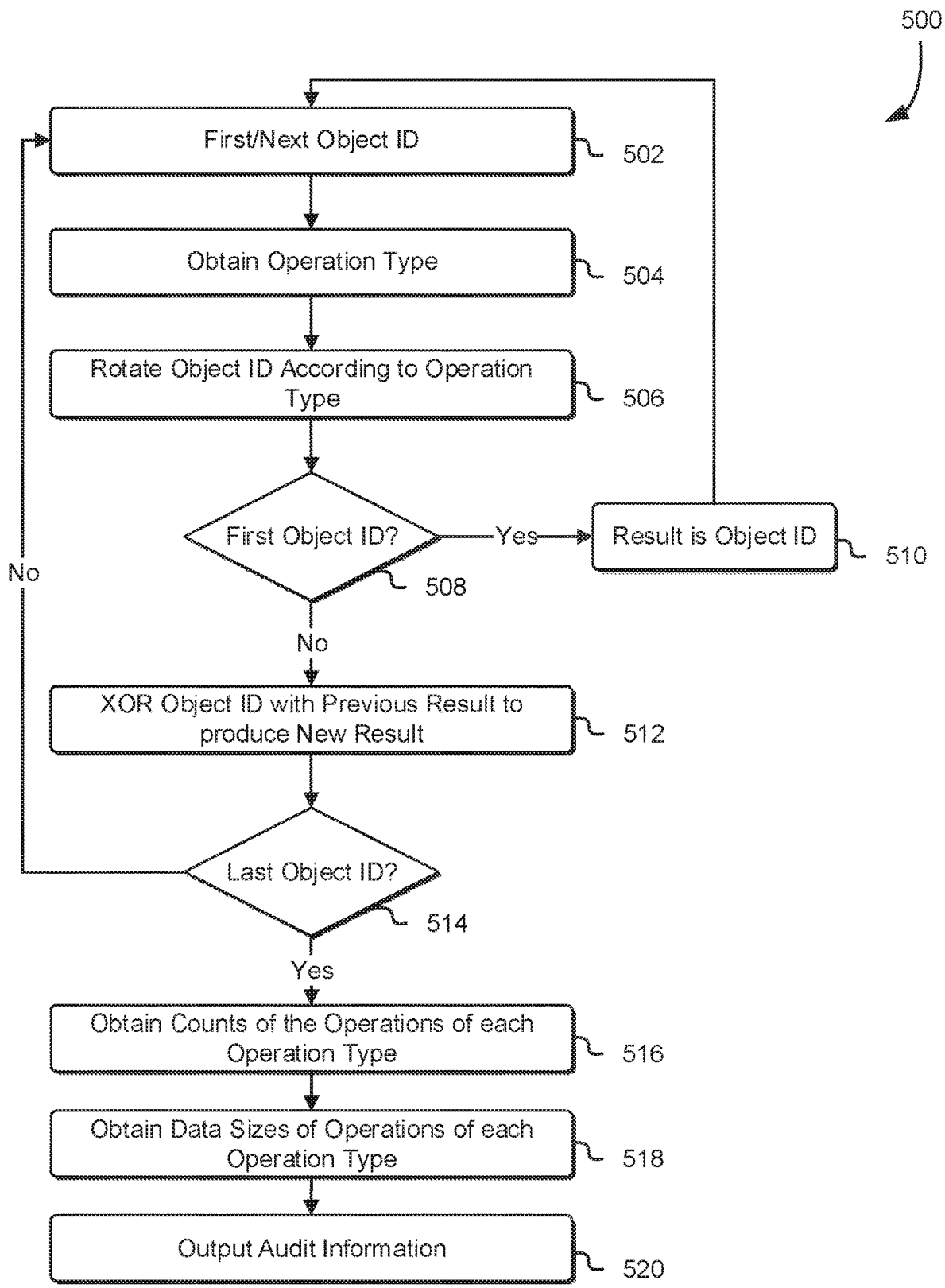
FIG. 5 is a flowchart that illustrates an example of auditing transformed data in accordance with an embodiment.

FIG. 5 is a flowchart that illustrates an example of generating audit entries in accordance with an embodiment. Some or all of the process 500 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 500 may be performed by any suitable system, such as a server in a data center, by various components of the system 600 described in conjunction with FIG. 6, such as the web server 606 or the application server 608, by multiple computing devices in a distributed system of a computing resource service provider, or by any electronic client device such as the electronic client device 602. For example, some or all of the process 500 may be performed by one or both of the system A 108 or system B 114 of FIG. 1. The process 500 includes a series of operations wherein a system generates audit information.

In 502, the system performing the process 500 may determine a first data object ID (or, if the system is returning from 510, a next data object ID) that corresponds to an entry in a group of log entries. For example, each entry in a group of log entries may have various fields, such as data object ID, operation code, data size, and so on. The system may retrieve the data object ID from its corresponding field in the entry. The system may retrieve the log entries from another system, such as system A 108 or system B 110 described in connection with FIG. 1. In various embodiments, the data object ID may retrieved from a log entry; log entries, which may correspond to records of operations performed on a specific set of data existing on another system, may be retrieved by the system performing the process 500 from the other system for processing. The system may process each data object ID individually, in which the system may determine and retrieve the data object ID's sequentially.

In 504, the system performing the process 500 may obtain the operation code corresponding to the particular log entry. The system may obtain the operation code in a same manner as the retrieval of the data object ID; the log entries retrieved may comprise an operation code as well as data object ID. As noted in the present disclosure, the operation code may indicate the type of operation performed. In various examples, the operation code may indicate an operation such as create (in which data may be created), delete (in which data may be deleted), or insert (in which data may be inserted).

In 506, the system performing the process 500 may transform the data object ID, such as by rotating, via a bitwise rotation, a data object ID according to an operation code, to produce a transformed ID. In various embodiments, various rotation schemes may be utilized as a transformation. For example, if the operation code is a create operation, the data object ID may be bitwise rotated 1 bit to the left. In an alternative example, if the operation code is a create operation, the data object ID may be bitwise rotated 1 bit to the right. Other variations are also considered as being within the scope of the present disclosure.

In 508, the system performing the process 500 may determine if the data object ID transformed is the first data object ID in the group of log entries. That is, if the data object ID is the only data object ID transformed, then there is no other transformed ID to XOR the present transformed ID with. Therefore, if the data object ID rotated corresponds to the first data object ID, the system proceeds to 510 and determines that the result (thus far) is the present transformed ID. From 510, the system may return to 502 to repeat the operations performed in 502-08 for the next data object ID. On the other hand, if the data object ID transformed is not the first data object ID, in 512 the system may perform a commutative operation, such as XOR, with the transformed ID and the previous result to produce a new result. In some examples, other commutative operations may be utilized in place of the XOR operation. The process 500 illustrates one manner of generating and outputting audit information; however, it is contemplated, that the operations of 508-12 may be performed in various manners. For example, at the beginning of the process 500, the system may seed the previous result with zero and omit the operations of 508-10; in this manner, in 512, the system may perform the commutative operation (e.g., XOR) between the transformed ID and zero to produce the new result, thereby achieving a similar result as the operations 508-510.

Following the XOR operation, in 514 the system may determine if the new result is the final result by determining whether the present data object ID corresponds to the last entry in the group of entries. If it is not, the system may return to 502 to repeat operations performed in 502-14 until all of the data object IDs of the retrieved log entries are processed. On the other hand, if the data object ID is the last data object ID of the group of entries, the system may obtain counts of the operations of each operation type. In 516, the system may count each operation of each operation type, which may include operations such as create, delete, and insert, from the retrieved log entries.

The system may store the operation counts determined for each operation type and utilize them in a summation to determine the total counts of the operations. In 518, the system performing the process 500 may obtain data sizes of operations of each operation type from the retrieved log entries. The system may obtain the data sizes by summing the data sizes of the operations of each operation type, which may include operations such as create, delete, and insert, from the retrieved log entries. The system may store the data sizes of each operation of each operation type and utilize them in a summation to determine the total data sizes of the operations. In 520, the system may output audit the new result as at least a portion of the audit information. For example, the outputted information of 520 may be one of the results received in 210 of the process 200 illustrated in FIG. 2. Further information regarding the generation of the audit information can be found in the description of FIG. 4. It should be noted that in various embodiments, one or more of the operations performed in 502-20 might be performed in various orders and combinations, including in parallel. For example, the operations of 516 and/or 518 may be performed prior to, in parallel with, or in combination with the operations of 502-514.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

As one skilled in the art will appreciate in light of this disclosure, certain embodiments may be capable of achieving certain advantages, including some or all of the following: (1) Techniques described and suggested in the present disclosure improve the field of computing, especially the field of multi-system data storage, by verifying the integrity of representations of data stored across multiple systems. (2) Additionally, techniques described and suggested in the present disclosure improve the transfer of data across multiple systems by verifying the correct operations have been performed as a result of transforming the data to representational forms expected by various systems. (3) Techniques described and suggested in the present disclosure additionally improve the efficiency of verifying representations of data by causing the auditing of the log entries of operations to be done in multiple batches, which can be processed with high parallelism. (4) Moreover, techniques described and suggested in the present disclosure are necessarily rooted in computer technology in order to overcome problems specifically arising in verifying the integrity of the storage and transfer of data across multiple computing resources.

FIG. 6 illustrates aspects of an example system 600 for implementing aspects in accordance with an embodiment. As will be appreciated, although a web-based system is used for purposes of explanation, different systems may be used, as appropriate, to implement various embodiments. In an embodiment, the system includes an electronic client device 602, which includes any appropriate device operable to send and/or receive requests, messages, or information over an appropriate network 604 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 606 for receiving requests and serving content in response thereto, although for other networks an alternative device serving a similar purpose could be used as would be apparent to one of ordinary skill in the art.

In an embodiment, the illustrative system includes at least one application server 608 and a data store 610, and it should be understood that there could be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the electronic client device 602 and the application server 608, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 610, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 612 and user information 616, which are used to serve content for the production side. The data store also is shown to include a mechanism for storing log data 614, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 610.

The data store 610, in an embodiment, is operable, through logic associated therewith, to receive instructions from the application server 608 and obtain, update or otherwise process data in response thereto, and the application server 608 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the electronic client device 602. Continuing with example, information for a particular item of interest is viewed in a dedicated page or window of the browser. It should be noted, however, that embodiments of the present disclosure are not necessarily limited to the context of web pages but are more generally applicable to processing requests in general, where the requests are not necessarily requests for content. Example requests include requests to manage and/or interact with computing resources hosted by the system 600 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 600, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 6. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as My SQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C"

refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
    obtaining a first set of log entries produced by a first service, wherein entries of the first set of log entries correspond to operations performed on first data;
    computing a first set of operation counts associated with different operation types in the first set of log entries;
    computing first audit information based on:
        the first set of operation counts; and
        a first checksum corresponding to data object identifiers in the first set of log entries;
    obtaining a second set of log entries produced by a second service, wherein entries of the second set of log entries correspond to the operations, performed in a different order, on second data, the second data being a different representation of the first data;
    computing a second set of operation counts associated with the different operation types in the second set of log entries;
    computing second audit information based on:
        the second set of operation counts; and
        a second checksum corresponding to data object identifiers in the second set of log entries;
    determining an audit result by comparing the first audit information with the second audit information; and
    transmitting, based on the audit result, an indication of whether an error has occurred in performance of the operations.

2. The computer-implemented method of claim 1, wherein:
    the different operation types include a first operation type and a second operation type that is different from the first operation type; and
    the first set of operation counts include a first count of operations in the first set of log entries of the first operation type and a second count of operations in the first set of log entries of the second operation type.

3. The computer-implemented method of claim 1, wherein computing the first audit information includes:
transforming the data object identifiers in the first set of log entries into set of transformed identifiers; and
generating the first audit information based on a size of the first data and the set of transformed identifiers.

4. The computer-implemented method of claim 3, wherein:
transforming the data object identifiers in the first set of log entries includes producing a set of transformed identifiers by, for each of the data object identifiers in the first set of log entries, performing, based on an operation code associated with the data object identifier, a transformation operation on the data object identifier to produce a transformed identifier; and
the first audit information includes a result of performing a commutative operation to the set of transformed identifiers.

5. A system, comprising:
a first service that:
performs a set of operations on first data;
produces a first set of log entries by logging the set of operations on the first data; and
generates first audit information that corresponds to the first set of log entries;
a second service that:
determines the set of operations based on the first set of log entries;
performs the set of operations on second data, wherein the second data is a different representation of the first data;
produces a second set of log entries by logging the set of operations on the second data; and
generates second audit information that corresponds to the second set of log entries, the first audit information and the second audit information including commutative transformations of object identifiers of the first set of log entries and the second set of log entries respectively; and
an audit service that:
produces, based on a comparison between the first audit information and the second audit information, an audit result;
determines, based on the audit result, whether an error has occurred with performance of the set of operations; and
transmits an indication of whether the error has occurred.

6. The system of claim 5, wherein:
the first audit information further includes:
a first amount of data affected by the set of operations performed on the first data; and
a second amount of data affected by the set of operations performed on the second data; and
the audit service further produces the audit result based at least on a comparison between the first amount of data and the second amount of data.

7. The system of claim 5, wherein:
the first audit information further includes:
a first count of operation types of the set of operations performed on the first data; and
a second count of operation types of the set of operations performed on the second data; and
the audit service further produces the audit result based on a comparison between the first count and the second count.

8. The system of claim 5, wherein the second data is extracted, transformed, loaded (ETL) data derived from the first data.

9. The system of claim 5, wherein the first service performs the set of operations in response to receipt of one or more requests received via an application programming interface from a customer of a service provider that provides the first service.

10. The system of claim 5, wherein the first service that generates the first audit information further, for each log entry of the first set of log entries:
on a condition that the log entry includes an operation code corresponding a first type, transform an object identifier in the log entry into a first fingerprint value; and
on a condition that the log entry includes an on operation code corresponding to a second type, transform the object identifier into a second fingerprint value different from the first fingerprint value.

11. The system of claim 5, wherein the set of operations include one or more mutating operations.

12. The system of claim 5, wherein:
the first audit information includes a first checksum produced by the audit service transforming the object identifiers of the first set of log entries into the first checksum; and
the second audit information includes a second checksum produced by the audit service transforming the object identifiers of the second set of log entries into a second checksum.

13. The system of claim 12, wherein the audit service that produces the audit result further determines that the audit result denotes success as a result of the first checksum matching the second checksum irrespective of the first set of log entries being in a different order from the second set of log entries.

14. A non-transitory computer-readable storage medium having stored thereon executable instructions that, as a result of being executed by one or more processors of a computer system, cause the computer system to at least:
obtain first audit information corresponding to a first set of log entries associated with a transformation performed on first data, the first audit information including a first commutative result produced by at least applying rotation operations and a commutative function to object identifiers associated with the first set of log entries;
obtain second audit information corresponding to a second set of log entries associated with the transformation performed on second data, the second data being a different representation of the first data, the second audit information including a second commutative result produced by at least applying the rotation operations and the commutative function to object identifiers associated with the second set of log entries;
validate that the second data matches the first data by at least comparing the first commutative result with the second commutative result; and
perform one or more actions depending on at least in part on whether the second data is a successful transformation of the first data.

15. The non-transitory computer-readable storage medium of claim 14, wherein:

the first set of audit information further includes a size of first data affected by the transformation;

the second set of audit information further includes a size of second data affected by the transformation; and the executable instructions that cause the computer system to validate that the second data matches the first data further include instructions that further cause the computer system to validate that the second data matches the first data by comparing the size of first data with the size of second data.

16. The non-transitory computer-readable storage medium of claim 14, wherein the executable instructions that cause the computer system to validate that the second data matches the first data further include instructions that cause the computer system to determine, on a successful validation, that the first commutative result matches the second commutative result regardless whether an order of entries in the first set of log entries is different from an order of entries in the second set of log entries.

17. The non-transitory computer-readable storage medium of claim 14, wherein the commutative function includes performing an exclusive OR (XOR) operation.

18. The non-transitory computer-readable storage medium of claim 17, wherein the executable instructions that cause the computer system to apply the rotation operations further include instructions that further cause the computer system to perform a rotation operation depending on operation type to each of the object identifiers prior to performing the XOR operation.

19. The non-transitory computer-readable storage medium of claim 14, wherein:

the first set of audit information further includes a first set of operation counts associated with different operation types in the first set of log entries;

the second set of audit information further includes a second set of operation counts associated with the different operation types in the second set of log entries; and the executable instructions that cause the computer system to validate that the second data matches the first data further include instruction that further cause the computer system to validate that the second data matches the first data by comparing the first set of operation counts with the second set of operation counts.

20. The non-transitory computer-readable storage medium of claim 19, wherein the different operation types include a delete operation and a create operation.

* * * * *